US010528507B2

United States Patent
Rand et al.

(10) Patent No.: US 10,528,507 B2
(45) Date of Patent: Jan. 7, 2020

(54) SYSTEMS AND METHODS FOR DIGITAL DATA TRANSFER BETWEEN AN ELECTRONIC DEVICE AND AN ACCESSORY APPARATUS REMOVABLY CONNECTED TO THE ELECTRONIC DEVICE

(71) Applicant: Cirrus Logic International Semiconductor Ltd., Edinburgh (GB)

(72) Inventors: Robert David Rand, Scottish Borders (GB); Nigel Burgess, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 19 days.

(21) Appl. No.: 15/847,183

(22) Filed: Dec. 19, 2017

(65) Prior Publication Data

US 2018/0173661 A1 Jun. 21, 2018

Related U.S. Application Data

(60) Provisional application No. 62/436,643, filed on Dec. 20, 2016.

(30) Foreign Application Priority Data

Jan. 23, 2017 (GB) .................................. 1701135.4

(51) Int. Cl.
G06F 13/38 (2006.01)
G06F 3/00 (2006.01)
(Continued)

(52) U.S. Cl.
CPC ........ *G06F 13/385* (2013.01); *G06F 13/4022* (2013.01); *G06F 13/4282* (2013.01);
(Continued)

(58) Field of Classification Search
None
See application file for complete search history.

(56) References Cited

U.S. PATENT DOCUMENTS 5,752,082 A    5/1998 Staples
6,202,109 B1   3/2001 Salo et al.
(Continued)

FOREIGN PATENT DOCUMENTS

EP    2662776 A2    11/2013

OTHER PUBLICATIONS

International Search Report and Written Opinion of the International Searching Authority, International Application No. PCT/GB2017/053824, dated Mar. 12, 2018.
(Continued)

*Primary Examiner* — Scott C Sun
(74) *Attorney, Agent, or Firm* — Jackson Walker L.L.P.

(57) ABSTRACT

This application relates to transfer of digital audio data between a host device (200) and an accessory apparatus (101) that may be connected to the host device via a suitable connector (106), such as a USB connector. A path selector (240, 270) is operable to establish either a first digital data path (201) or a second digital data path (202) for transfer of digital data. The first digital data path (201) includes a first data bus host (103) and a general purpose digital data interface (131) suitable for bulk data transfer between the first data bus host and the applications processor (110) of the device. This may be a default USB path. The second digital data path (202) includes a second data bus host (230) and at least one pair of second path data interfaces (140, 141). The second data bus host (230) does not form part of the applications processor and each of said second path data interfaces comprises a digital audio interface suitable for streaming of audio data. The path selector selectively establishes the first data path for bulk digital data transfer or the second data path for streaming of audio data where latency is important.

24 Claims, 9 Drawing Sheets

(51) Int. Cl.
    *G10L 19/00*     (2013.01)
    *G06F 13/40*     (2006.01)
    *G06F 13/42*     (2006.01)
    *H04R 3/00*      (2006.01)
    *H04R 3/12*      (2006.01)

(52) U.S. Cl.
    CPC ............... *G10L 19/00* (2013.01); *H04R 3/00* (2013.01); *H04R 3/12* (2013.01); *H04R 2420/07* (2013.01); *H04R 2499/11* (2013.01); *Y02D 10/14* (2018.01); *Y02D 10/151* (2018.01)

(56) References Cited

U.S. PATENT DOCUMENTS

| | | | |
|---|---|---|---|
| 2007/0124150 A1* | 5/2007 | Sinai | G06F 3/162 704/500 |
| 2010/0109749 A1 | 5/2010 | Chen et al. | |
| 2010/0306443 A1 | 12/2010 | Lin et al. | |
| 2013/0091308 A1* | 4/2013 | Cha | H04L 69/08 710/11 |
| 2015/0309956 A1 | 10/2015 | Gong et al. | |

OTHER PUBLICATIONS

Combined Search and Examination Report, UKIPO, Application No. GB1701135.4, dated Jul. 31, 2017.

\* cited by examiner

SYSTEMS AND METHODS FOR DIGITAL DATA TRANSFER BETWEEN AN ELECTRONIC DEVICE AND AN ACCESSORY APPARATUS REMOVABLY CONNECTED TO THE ELECTRONIC DEVICE

TECHNICAL FIELD

The field of representative embodiments of this disclosure relates to methods, apparatus and/or implementations concerning or relating to audio data transfer and especially to transfer of digital audio data between a host device and a connected accessory apparatus, and in particular to transfer of digital audio data via a USB compatible connector.

BACKGROUND

Many contemporary electronic devices have the facility to connect with external or peripheral devices for transfer of audio signals. For instance, mobile telephones, tablets, laptop computers, mp3 players and the like are examples of electronic devices that are operable with peripheral audio devices such as a headset, for example, that is external to and distinct from the electronic device. A peripheral device such as a headset may typically comprise mono or stereo speakers for audio playback and possibly a microphone for voice communication.

Such external peripheral audio apparatus has often been connected via a mating connector such as a plug and socket arrangement for transfer of analogue audio signals. For instance, many audio peripherals such as headsets have a jack plug such as a 3.5 mm jack plug for connection to a suitable jack socket on the host electronic device. A well-known arrangement for a jack plug and its associated socket is TRRS (Tip-Ring-Ring-Sleeve), which has four contacts for left audio, right audio, microphone, and ground. This allows for transfer of two channels of analogue audio data from the host device to the peripheral and/or transfer of a channel of analogue audio data from the peripheral microphone to the host device.

Increasingly it is becoming desirable to allow for digital audio data transfer between the host device and a connected peripheral. Various digital data interfaces are known, such as USB.

Digital data transfer protocols, such as the USB 2.0 specification or later specifications, can provide for transfer of digital data at relatively high data rates, which means that such interfaces can be used for transfer of relatively large data files, such as high quality video files for example. However historically USB and associated software stacks in the Android™ operating system in particular, commonly used on some electronic devices such as cellphones, were never developed with the aim of streaming time-critical audio data and, the latency associated with the digital signal path established, i.e. the time taken for a digital signal to propagate from a source to a destination via the digital signal path, may be undesirably high for some such audio applications.

SUMMARY

Embodiments of the present invention provide methods and apparatus for transfer of digital audio data.

Thus according to the present invention there is provided an electronic device comprising:

a first connector for removably connecting the electronic device to an accessory apparatus for digital data transfer;

a path selector operable to establish a first digital data path between a first module of the electronic device and the first connector and also operable to establish a second digital data path between the first module of the electronic device and the first connector;

wherein the first digital data path comprises a first data bus host and a general purpose digital data interface suitable for bulk data transfer between the first data bus host and a processing module of the applications processor;

wherein the second digital data path comprises a second data bus host and at least one pair of second path data interfaces between the second data bus host and the first module, wherein the second data bus host does not form part of the applications processor and each of said second path data interfaces comprises a digital audio interface suitable for streaming of audio data; and wherein the path selector is configured to selectively establish the first data path or the second data path.

In some embodiments each of the first and second data bus hosts comprises a respective USB host.

The general purpose digital data interface and the first data bus host may be integrated with the applications processor.

The electronic device may further comprise an audio codec. In some embodiments the second data bus host is integrated with the audio codec. The least one pair of second data path interfaces may comprise a first digital audio interface of the audio codec, i.e. one of a pair of audio interfaces may be an audio interface of the audio codec. The device may include at least one audio transducer and the audio codec may be configured such that said first digital audio interface can also be used for audio data transfer when operating said at least audio transducer.

In some embodiments however the second data bus host may be formed as a separate component to the audio codec.

The audio codec may also be operable in an analogue accessory adapter mode for transfer of analogue audio signals to and/or from a connected accessory apparatus via the first connector.

In some embodiments the path selector is configured to select the first digital data path or the second digital data path depending on detection of a type of accessory apparatus connected and/or a type of digital data transfer required. The path selector may be configured to select the first digital data path as a default data path for data transfer with an accessory apparatus connected to the first connector. The second digital data path may be selected only when a suitable audio accessory apparatus is connected and/or the only data to be transferred between the electronic device and the connected accessory apparatus is audio data and associated control data.

The path selector may comprise a switch arrangement operable to selectively route signals between the first connector and either of the first and second data bus hosts. The switch arrangement may comprise a multiplexor. For an audio codec which is operable in analogue accessory adapter mode, the switch arrangement may also be operable to selectively route such analogue audio signals between the first connector and the audio codec.

In some instance the first module, which exchanges data with the connected accessory, may be a module of the applications processor. The at least one pair of second path data interfaces may comprise a first digital audio interface of the applications processor, i.e. one of a pair of the digital audio interfaces may be a digital audio interface of the applications processor.

In some instances however the first module may be a module of the electronic device which is separate from the applications processor. For example the first module may be a wireless modem. In such instance the second data path, between the second data bus host and first module, may pass via the applications processor and said at least one pair of second path data interfaces may comprise a first audio interface of the applications processor for data exchange with the second data bus host and a second audio interface of the applications processor for data exchange with the first module. In some instances however the second data path, between the second data bus host and first module, may bypass the applications processor and the at least one pair of second path data interfaces may comprise an audio interface of the first module for data exchange with the second data bus host.

The second digital data path may be configured such that a latency associated with transfer of audio data between the audio codec and a connected accessory device via the second data path is 5 ms or less. The second digital data path may be configured such that a latency associated with a round-trip signal between a connected accessory apparatus and the first module of the electronic device via the second digital data path is 20 ms or lower.

The first connector may be a USB compliant connector, such as a USB type-C connector.

The electronic device may be at least one of: a portable device; a battery powered device; a communication device; a mobile telephone; a computing device; a notebook, laptop or tablet computer device; a wearable device; a voice controlled device.

In another aspect is provided a method of digital data transfer between an electronic device and an accessory apparatus removably connected to the electronic device via a first connector, the method comprising:
    selectively establishing either a first digital data path between a first module of the electronic device and the first connector or a second digital data path between the first module of the electronic device and the first connector;
    wherein the first digital data path comprises a first data bus host and a general purpose digital data interface suitable for bulk data transfer between the first data bus host and a processing module of the applications processor; and
    wherein the second digital data path comprises a second data bus host and at least one pair of second path data interfaces between the second data bus host and the first module, wherein the second data bus host does not form part of the applications processor and each of said second path data interfaces comprises a digital audio interface suitable for streaming of audio data.

In a further aspect there is provided an electronic device comprising: an applications processor; a first connector for removably connecting the electronic device to an accessory apparatus for digital data transfer; a path selector operable to establish a first digital data path between a first module of the electronic device and the first connector and also operable to establish a second digital data path between the first module of the electronic device and the first connector; wherein the first digital data path includes the applications processor and also comprises a first data bus host for controlling data transfer with a connected accessory via the first connector; wherein the second digital data path comprises a second data bus host and at least one pair of second path data interfaces between the second data bus host and the first module, wherein the second data bus host does not form part of the applications processor and each of said second path data interfaces comprises a digital audio interface suitable for streaming of audio data; and wherein the path controller is configured to selectively establish the first data path or the second data path.

In a yet further aspect there is provided an electronic device comprising: a first connector for removably connecting the electronic device to an accessory apparatus for digital data transfer; an applications processor comprising a first data bus host in a first digital data path for transfer of digital data with an accessory apparatus connected via the first connector; and a second data bus host in a first digital data path for transfer of digital data with an accessory apparatus connected via the first connector; wherein the applications processor is connected to the second data bus host via digital audio interfaces; wherein the application processor is configured, in use, to selectively transfer digital data with the connected accessory apparatus via the first digital data path or the second digital data path.

Another aspect provides an electronic device comprising: an applications processor comprising: a first digital data interface operable for data transfer between a module of the applications processor and a first data bus host, wherein the first digital data interface is suitable for bulk data transfer; and a second digital data interface operable for data transfer between the applications processor and a second data bus host, wherein the second digital data interface comprises a digital audio interface suitable for streaming of audio data; and a path controller for selectively routing digital data via the first digital data interface or the second digital data interface; wherein each of the first data bus host and the second data bus host is configured to control digital data transfer with an accessory apparatus removably connected, in use, to the electronic device via a first connector.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for transfer of audio data between a host electronic device and a connected accessory apparatus.

Figure 1:
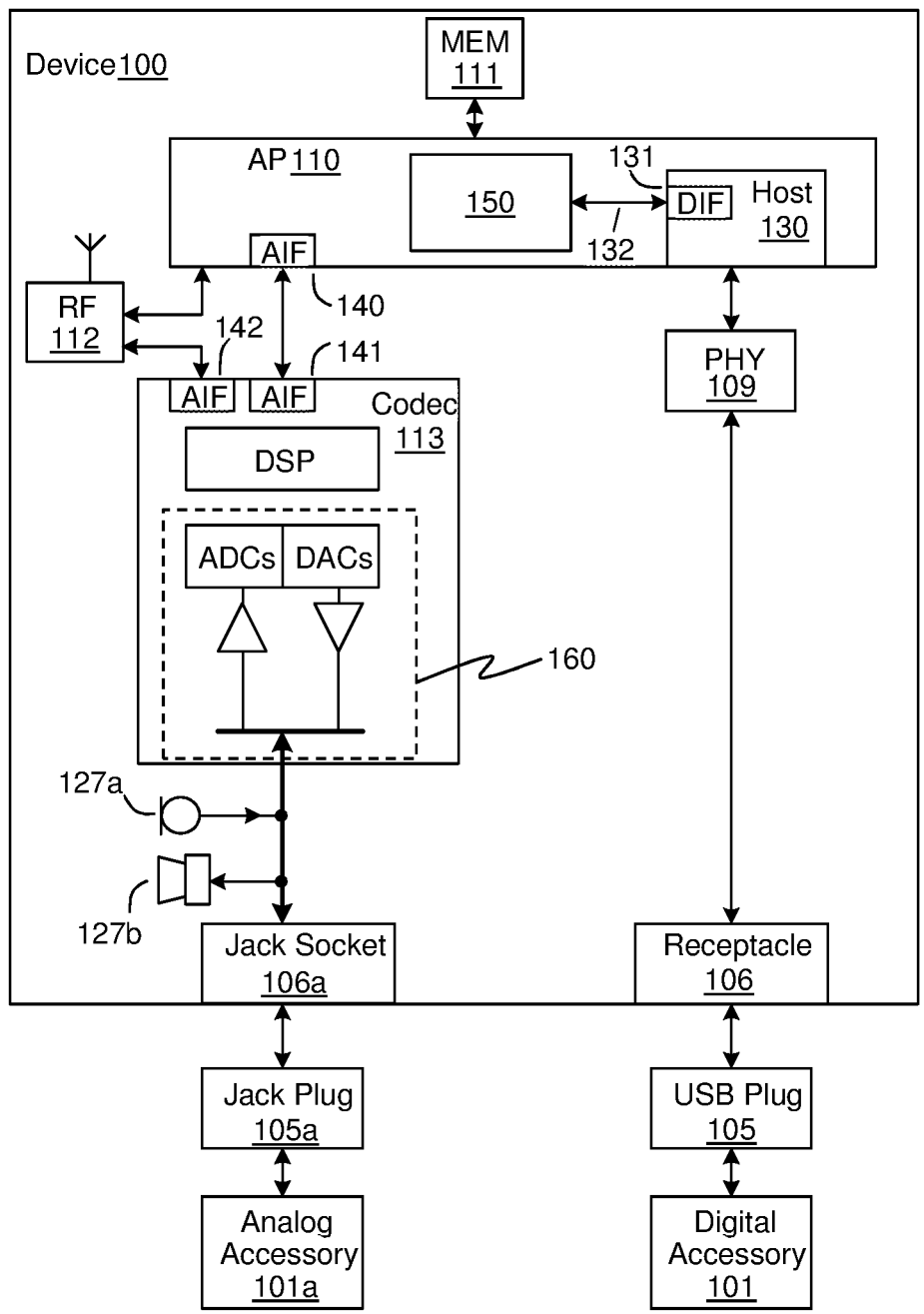
FIG. 1 illustrates an electronic device and how it may interface with an accessory apparatus.

FIG. 1 illustrates one example of an electronic device 100, such as a mobile telephone or tablet computer for example, which may, in use, be removably physically connected to an accessory apparatus. The electronic device 100 may thus have a connector 106, such as a receptacle for mating with a corresponding connector, such as a plug 105, associated with one or more alternative accessory apparatuses 101, to allow for various accessory apparatuses 101 to be removably physically connected to the portable electronic device 100 for transfer of data.

In some examples the portable electronic device 100 may be capable of transfer of bulk digital data with a suitable accessory apparatus 101, for example the transfer of complete files containing photographs, videos, compressed audio files such as MP3-encoded audio tracks or application programs. As used herein a reference to transfer of data between the portable electronic device 100 and a connected accessory apparatus 101 shall include transmitting data from the portable electronic device 100 to the connected accessory apparatus 101 and/or receiving data at the portable electronic device 100 from the connected accessory apparatus 101. The term bulk transfer shall refer to transfer of relatively large amounts of data, for instance transfer of complete files, e.g. pictures, video or audio files, documents etc.

In some examples the connector 106 of the electronic device 100 may be a suitable USB (Universal Serial Bus) compliant connector, for example one that is compliant with an existing or future USB specification.

For instance the connector 106 of the electronic device 100 may be a USB Type-C connector. The USB type-C connector is a reversible connector, i.e. it has two-fold rotational symmetry and is designed to be operable with a type-C plug mated with a type-C receptacle in either possible mating orientation. The type-C connector is designed to be suitable for data transfer according to the present USB 3.1 specification for high data rate transfer and the USB type-C connector is, for example, particularly suitable for passing digital data at high data rates for e.g. large video files.

As used in this disclosure the term "USB type-C" or just "USB-C" shall be taken to refer to compatibility with the USB type-C specification, which at the time of writing is the "USB Type-C™ Cable and Connector Specification Revision 1.2, Mar. 25, 2016, available (at the time of writing) from the USB organisation website at: http://www.usb.org/developers/docs/, the contents of which are incorporated herein by reference thereto. The term USB type-C shall be taken to mean any connector which is compatible with the release 1.2 specification identified above or compatible with the specification as it may be modified in the future.

For bulk digital data transfer the connector 106 will be suitably connected to a physical layer circuit (PHY) 109, e.g. a USB PHY. As will be understood by one skilled in the art a physical layer circuit is a module for input and/or output of the relevant digital data signals from and/or onto a physical bus according to specified physical signal levels and data format and in particular a USB PHY will comprise a USB transceiver for input and/or output of USB signals onto or from a USB bus according to a relevant USB standard.

The PHY 109 may be coupled for communication with a data bus host 130, e.g. a USB host, which controls the PHY and supplies data to be transmitted on the bus to the PHY and receives data received on the bus from the PHY. USB hosts described in this disclosure may comprise a link controller which controls the transfer, to and from a PHY, of data on the non-USB-bus side of the PHY, as well as host control logic which configures the host. This data may be written to, stored in and read from some form of memory 111 in the device 100, for example via an applications processor (AP) 110 of the electronic device 100.

The PHY 109 and/or the host 130 may be separate from the AP 110 or may be integrated with the AP, i.e. the host 130 may be formed as part of the AP 110. In this illustrated example the AP 110 comprises a USB host 130, which communicates externally (i.e. outside of the AP) to the PHY 109 and communicates internally to processing circuitry 150 on the AP and/or the external memory 111 via some on-chip digital interface 131 and data bus 132, e.g. an AMBA AHB bus. In other examples, the host and PHY may be integrated together but externally to the AP, and may communicate to processing circuitry 150 on the AP and/or memory 111 via some digital interface, e.g. SPI.

Thus digital data to/from the PHY 109 for transfer to/from the accessory apparatus 101 via the connector 106 may be transferred via the host 130, and possibly processing circuitry 150 on the AP, to/from memory 111.

An electronic device 100, such as a mobile telephone or tablet computer for example may also comprise an audio circuit such as an audio codec 113 connected to receive digital audio data streams and process them to provide audio signals to loudspeakers 127b within the device 100 and/or to accept audio signals from microphones 127a within the device 100 and convert them to digital audio data streams. These streams may be routed and processed in a variety of ways depending on the particular use case. For example the audio data contained within the digital audio data stream could be stored locally in memory 111. The digital audio data stream could be processed by digital signal processing circuitry (DSP) in the codec 113 and/or processed by processing circuitry 150 in the AP 110. In some instances the digital audio data stream may be routed to a wireless modem 112 for transmission via a local or wide area network.

The codec 113 may be coupled to the AP 110 or other components of the device 100 via respective digital Audio Interfaces (AIF). FIG. 1 illustrates that an AIF 140 of the AP 110 may be coupled to a corresponding first AIF 141 of the codec. In some instances the codec 113 may have at least a second AIF 142 for audio data transfer with some other component directly, i.e. not via the AP, e.g. for audio data transfer with the RF module 112. Such AIFs 140, 141 and 142 are designed to receive or transmit streams of digital audio data with negligible distortion or variation of time delay and thus be faithfully recorded or rendered, in contrast to other more general purpose digital data interfaces where precise timing is unimportant and which may be optimised for other considerations. Examples of suitable digital audio interfaces include I2S, which comprises a precision bit clock on one wire with multi-bit data words at regular intervals on a second wire framed by another clock on a third wire.

Audio signals may also be transferred to loudspeakers or from microphones in detachable accessories 101a such as headphones or headsets, which may be connected via a suitable connector 106a, for example a socket compatible with a jack plug 105a of an accessory apparatus 101a, for instance the conventional 3.5 mm 4-pole jack.

It will be understood that the codec 113 may conventionally have analogue interface circuitry 160 which may comprise ADCs or DACs for transfer of analogue audio signals between the codec 113 and audio transducers 127a, 127b of the electronic device 100 and/or for transmitting analogue audio signals to and/or receiving analogue audio signals from a connected accessory apparatus 101a. In a conventional mode of operation therefore audio data to be transmitted to a connected accessory apparatus may thus be provided in a digital format from say the AP 110 to the codec 113, via audio interfaces 140 and 141, and used to generate suitable analogue driving signals. Likewise analogue audio signals may be received and converted to digital signals by the codec 113 and the digital signals transmitted to the AP, or to some other component such as RF module 112, via the digital audio interfaces AIF.

The digital audio interfaces 140 and 141, together with other well established processing in the codec 113 or AP 110 may provide low latency paths to or from analogue transducers of connected accessory apparatus.

However there is now a desire to provide accessories with higher performance or extra functionality, for example using digital signal processing in a headset to equalise loudspeaker frequency response or distortion or to protect loudspeakers from over-excursion using sophisticated digital plant models. Thus the audio streams to be transferred to from digital accessories are desired to be digital rather than analog. This also facilitates the transmission of other channels of data for example from motion sensors for "Liveness" detect or control signalling, or in-ear temperature sensors.

The existing USB connector and data path described above, i.e. via host 130, PHY 109 and connector 106 is one candidate for such digital transmission of these data streams. However, for some applications the latency associated with an audio signal path for transfer of audio data to and from a connected accessory apparatus may be important.

For example, for mobile telephony it is desired to limit delays associated with the mobile telephone and any connected accessory apparatus to maintain a good conversational experience. The ETSI technical specification for UMTS LTE™ Terminal acoustic characteristics for telephony (3GPP TS 126 131 version 12.3.0 Release 12) specifies a round-trip time (for sending and receiving data) for a user equipment, e.g. a mobile telephone with any connected audio accessory, of a maximum of 190 ms and preferably less than 150 ms. It is therefore desired that the latency associated with transfer of digital audio data between electronic device 100 and a connected audio accessory apparatus 101 is relatively low.

Also some audio applications involve a sound produced by a user (or in the environment of a user) being received by a microphone of the accessory apparatus 101, transmitted to the electronic device 100, possibly subjected to some processing, and then played back to the user in effectively real-time, possibly via a speaker of the accessory apparatus 101. For example a karaoke application might involve a user singing into a headset microphone, and playing the singer's voice back to the user possibly after applying some audio effects. In such applications, where the user may hear both the original sound generated and the version of the sound played back via the speaker, the delay or latency between the original and the reproduced sound is important. At a delay of around 12 to 15 ms or so a user may start to perceive latency issues and at delays of above about 20 ms or so users may perceive distinct sounds.

Also for gaming applications audio cues, for example brake or tyre squeal or gunshots, played to the user must be responsive to button presses on an accessory, with a similar requirement for short latency between the physical button press and the acoustic playback of the audio cue.

It has been found that with some operating systems used on some electronic devices, such as the Android™ operating system, the latency associated with a digital signal path established as described above (i.e. via host 130 and PHY 109) may be undesirably high for some audio applications. By latency of the digital signal path is meant the time taken for a signal to propagate along the signal path from a source to a destination, for instance the delay between receipt of an audio signal at a microphone of the accessory apparatus and the corresponding digital data signal being received at the AP 110 of the device 100. For the applications discussed above, e.g. real-time playback of received sounds or compliance with the LTE specification, what may be of concern is the latency of a round trip signal path, e.g. the time taken for a signal to be passed from the microphone of the accessory 101 to AP 110 together with the any delay within the AP and with the time for a signal to then travel from AP 110 to a speaker of the accessory.

This may particularly apply to some electronic devices using Android™ as an operating system and which use USB for digital data transfer.

Embodiments of the present disclosure relate to methods and apparatus for audio data transfer that at least mitigate at least some of these issues.

In some embodiments of the present disclosure an electronic device may comprise a first connector for removably connecting the electronic device to an accessory apparatus for data transfer, together with a path selector operable to establish a first digital data path between a first module of the electronic device and the first connector and also operable to establish a second digital data path between the first module of the electronic device and the first connector. The first digital data path includes a first data bus host and a first digital data interface for digital transfer of data between a processing module of the AP and the first data bus host. The second digital data path includes a second, different, data bus host and at least one pair of second path data interfaces between the second data bus host and the first module.

The first digital data interface is a data interface of the AP and may be suitable for bulk transfer of data. The first digital data interface, will, in use be paired with another suitable digital data interface, e.g. of processing module 150 of the AP 110. The first data bus host, which may be a USB host, can thus transfer bulk data with a connected accessory device via the first data path, in a similar fashion as described above with reference to USB host 130 and digital interface 131. The first data path may thus be suitable for transfer of a variety of digital data via the first data path, i.e. the first digital interface controller may be configured for digital data including, but not limited to, digital audio data.

The second data bus host is an auxiliary or additional data bus host and, in some embodiments, does not form part of the AP. The second data bus host may also be a USB host and may be a USB host of the same general type as the first data bus host, e.g. both may be USB 2.0 hosts. In embodiments of the disclosure the part of the second data path extending between the second data bus host and the first module comprises at least one pair of data interfaces and each of these data interfaces (i.e. each of the individual interfaces of the or each pair) is a digital audio interface, i.e. a digital data interface suitable for exchange of timing sensitive streams of audio data, such as the AIFs 140 and 141 described above.

As used herein the term digital audio interface thus means a data interface suitable for transfer of time sensitive audio data, e.g. suitable for streaming of digital audio data, for instance for playback. In this way digital data may be exchanged between a source/destination module of the electronic device and the second data bus controller via the digital audio interfaces, which may have low associated latency and good timing fidelity. Data exchange between the second data bus controller and the connected accessory may comprise USB or related data exchange and be relatively low latency. The second digital data path may thus provide a dedicated data path for low latency transfer of audio data and associated control information.

The second data bus host may, in some instances, be implemented on an audio circuit of the host device, for instance an audio codec, which is separate to an applications processor of the host device. The electronic device thus has two data bus hosts for providing two separate digital data paths.

A path selector may be configured to selectively establish the first or the second digital data path. The path selector may select the first or second path depending on detection of a type of accessory apparatus connected and/or a type of digital data transfer required.

Thus, for example, the first digital path may be a default digital data path and the first data bus host may be a main or primary data bus host. However when a suitable audio accessory apparatus is connected and/or the only data to be transferred between the electronic device and the connected accessory apparatus is audio data, possibly with some limited associated control data, the second signal path may be selected instead of the first data path. The second data bus host, and the second data path, may thus be used when only audio data and associated control data is to be transferred and thus may be optimised for low latency digital data transfer.

The first connector may be a USB compliant connector, for instance a USB Type-C connector, and the first and second digital data interface controllers may comprise first and second USB hosts. Embodiments of the present disclosure may thus have a first, main, USB host, which may for instance be implemented by the AP 110 as discussed above which would be the default host, but also a second, auxiliary USB host, for instance implemented on an audio codec, which is available for low latency audio data transfer.

In some instances the first module of the electronic device, i.e. the relevant source/destination module, may be a module of the AP. In which case the AP includes both the general purpose digital interface for data exchange with the first data bus host and also a digital audio interface that can be used for data exchange with the second data bus host. In some instances the source/destination module may be a different module, such as a wireless modem, but the second data path may still pass via the AP. A controller of the AP may thus select the appropriate one of the first and second data paths. However in some instances the second component may be a module of the electronic device which is separate from the AP, such a wireless modem, and the second data path may be established that bypasses the AP, e.g. via suitable AIFs on a codec incorporating the second data bus host and on the wireless modem.

Figure 2:
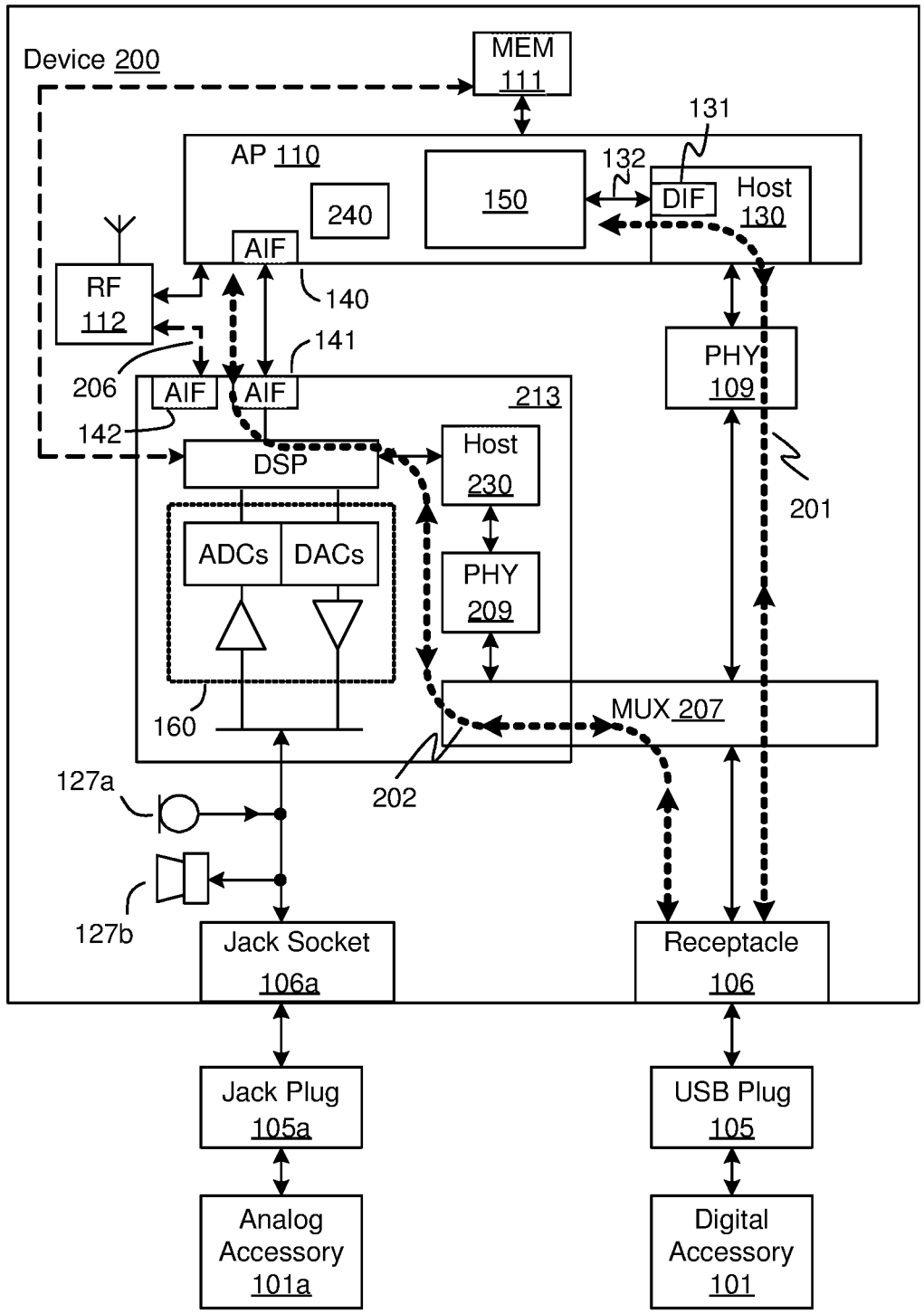
FIG. 2 illustrates an electronic device according to an embodiment and how it may interface with an accessory apparatus.

FIG. 2 illustrates one example of an embodiment. FIG. 2 illustrates various components of an electronic device 200 in which similar components or functions to those illustrated in FIG. 1 are identified by the same reference numerals.

As described previously the device 200 has a first connector 106, which may for example be a USB compliant connector such as a USB Type-C connector.

However in this embodiment a first data path 201 or a second data path 202 may be established between the connector 106 and a component of the device 200, for example the AP 110, for digital data transfer with an accessory apparatus 101 connected, in use, to the connector 106. The desired data path is established by means of a path selector which comprises switching arrangement 207 in series with connector 106 that may be configured in various ways to configure the data paths to and from the connector.

Switching arrangement 207 may comprise actual switch devices, for example using MOS transistors as series switches. Alternatively or additionally the switching function may be implemented by placing outputs of circuit blocks into high-impedance states or logically switching or ignoring inputs to circuit blocks. Components of switching arrangement 207 may be integrated on a codec 213, AP 110 or in other integrated or non-integrated circuitry in device 200.

The first data path 201 may comprise a data path from suitable contacts/pins of the connector 106 to the AP 110 via physical layer circuit PHY 109, in a similar manner as described with reference to FIG. 1. For the first data path 201 the AP 110 may comprise a first USB Host and a thus, in use, a host/link controller module 130 of the AP acts as a first host and transfers data to processing circuitry of the AP and/or memory 111 via an internal digital interface 131. The first data path 201 may be the default path for digital data transfer to/from a connected accessory apparatus, or at least for digital data transfer according to a particular specification or protocol. For example in some embodiments PHY 109 may be a USB PHY for data transfer in accordance with the USB 2.0 specification and there may be another USB PHY (not shown) for data transfer in accordance with the USB 3.0 specification. The first data path 201 may therefore be the default data path to be used for bulk data transfer in accordance with the USB 2.0 specification.

The second data path 202 is via codec 213 of the device 200. In this example the codec 213 has an embedded USB host 230 to act as a data bus host for the second digital data path. The USB host 230 of the codec is thus a second or auxiliary host. In this example the codec 213 also comprises a USB physical layer circuit 209 for input and/or output of USB signals to the connector 106. The PHY 209 of the codec may be generally of the same specification as PHY 109, e.g. a USB 2.0 PHY. The codec 213 also has an AIF 141 for communicating with a corresponding AIF 140 of the AP and the second data path also comprises a pair of AIFs 140 and 141.

The second data path 202 is thus an alternative to the first data path 201 that can be selected for use for some applications. In particular the second data path 202 may be selected for use for particular audio applications, e.g. for streaming of digital audio data and relatively limited amounts of associated control data. In some embodiments the second data path 202 may be suitable for use for transfer of Class 1 Audio, Class 2 Audio and Human Interface Device (HID) control data in accordance with the USB data classifications. The second data path 202 may thus be selected for use when the data to be transferred comprises only USB Class 1 Audio or USB Class 2 Audio and/or HID control data.

The second data path may comprise the same digital audio interface 140 of the AP as may used to transfer audio data streams to/from the codec 213, for conventional operation, for example as would be used for transfer or audio data streams from or to on-board microphones 127a or speakers 127b of the device 200 or to/from an accessory apparatus connected via jack socket 106a. In other words the digital audio interface 141 of the codec may be used for a legacy mode of operation for digital data exchange with AP 141, where the codec inputs/outputs analogue audio signals. In another mode of operation, the same AIF 141 be used as part of the second data path for digital data exchange with the AP 110, but in this alternative mode of the operation the codec will transmit and receive digital data signals to/from a connected accessory 101, via the embedded host 230 and PHY 209.

The second data path may be subjected to similar data processing as may be used in a legacy mode of operation. Thus for example the processing of the digital signal in the second data path within the codec 213 and/or AP 110 may be similar to the digital signal processing applied to the digital signal in the legacy mode of operation. Thus the latency, at least to and from the codec 213 will be similarly low to that of the legacy audio path. Much of the overheard involved in frame-by-frame buffering and processing of the data in the first data path via the AP's internal processing and digital interface 131 to host 130 is avoided. The second data path via the audio interface 140 of the AP 110 thus has a lower latency for data transfer between the AP and connector 106 than the first data path 201 via the digital data interface 131 of the AP.

The USB host 230 of the codec 213 may have class driver APIs suitable for USB Class 1 Audio and USB Class 2 Audio. There may also be a class driver for certain HID (human interface device) control, for instance for detecting button presses for control of certain features. For instance there may be controls on the accessory apparatus for volume control or various playback controls such one or more of play, pause, stop, fast forward, skip, mute, play-mode such as shuffle or repeat etc. There may also be controls for operating certain features, for instance power-on or power-off, receive or end a call etc. Some accessory apparatus may also have controls for adjusting various audio parameters such as tone, balance, equaliser settings etc. The USB host 230 of the codec 213 may thus be able to receive certain control information which may be used to control aspects of operation of the codec 213 and/or AP 110 or other module of the electronic device 200 as appropriate.

The second data path 202 may thus provide a low latency digital data path for transfer of digital audio data and associated control information that is suitable for use for some audio applications. A path controller 240 of the electronic device 200 may decide whether to use the first data path 201 or the second data path 202 for a connected accessory apparatus 101 depending on the type of connected accessory apparatus 101 and/or the relevant user application requiring data transfer. In some instances the AP 110 may comprise the path controller. The path controller may cooperate with or control the path selector 207.

Figure 3A:
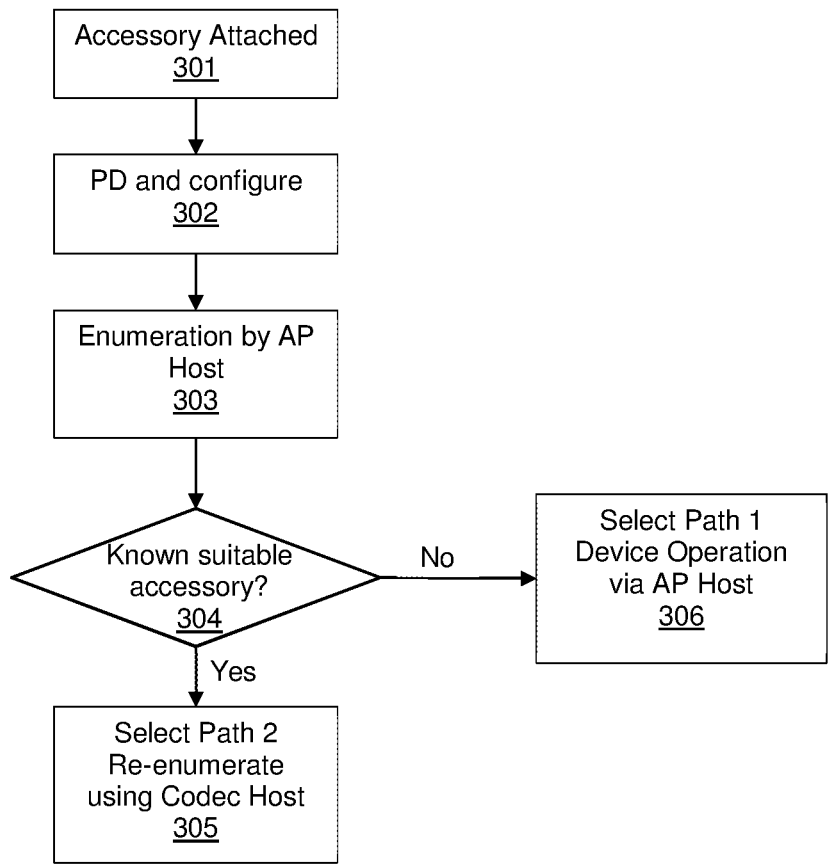
FIGS. 3a and 3b illustrate flow charts of methods according to embodiments.

In use the USB host 130 may be the master host and the first data path 201 may be used as a default data path for communication with a suitable accessory apparatus when first connected. FIG. 3a illustrates a flowchart of a method according to an embodiment. At block 301 it is detected that an accessory apparatus 101 capable of digital data transfer, in this example USB digital data transfer, is connected to the electronic device 200. This may be detected when a suitable connector 105 of the accessory apparatus 101 is first connected to the connector 106 of the electronic device 200, or may occur on power-on or reset of the electronic device 200 with a suitable connection already present. A configuration controller (which may be implemented on a "Power Delivery" (PD) circuit as is known) may detect the connected accessory apparatus 101 and determine whether it is capable of digital data transfer via the conventional pin detection and configure the switch arrangement 207 accordingly, as indicated by block 302. Where the accessory apparatus 101 is suitable for digital data transfer the AP host 130 may initialise as the data transfer controller, i.e. the bus controller, and perform enumeration as will be understood by one skilled in the art, as indicated by block 303. The AP host 130 can then communicate to determine further the type of accessory apparatus connected, as indicated by block 304. If the accessory is of a known type that is suitable for use with the auxiliary host, i.e. the codec host 230; then control over data transfer with the accessory may be handed over to the codec host 230. The codec host 230 may then re-enumerate, (as illustrated at block 305) to become the active host. Subsequent communication with the accessory apparatus may then be controlled by the codec host 230.

This also has the advantage that the AP host 130 is no longer required to monitor for communication from the connected accessory apparatus. This may allow the AP 110 to enter a low power or sleep mode when not being used. This can reduce power consumption of the electronic device as a whole.

Figure 3B:
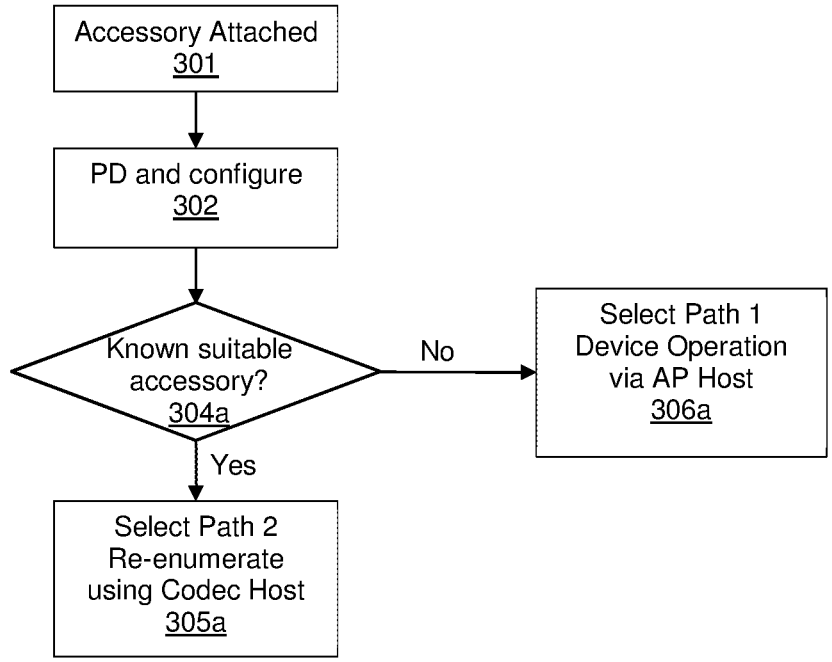

FIG. 3b illustrates a flowchart of an alternative method according to an embodiment. At block 301 it is detected as above that an accessory apparatus 101 capable of digital data transfer, in this example USB digital data transfer, is connected to the electronic device 200. This may be detected when a suitable connector 105 of the accessory apparatus 101 is first connected to the connector 106 of the electronic device 200, or may occur on power-on or reset of the electronic device 200 with a suitable connection already present. A configuration controller (which may be implemented on a "Power Delivery" circuit as is known) may detect the connected accessory apparatus 101 and determine whether it is capable of digital data transfer via the conventional pin detection and configure the switch arrangement 207 accordingly, as indicated by block 302. A suitable PD can then communicate to determine further the type of accessory apparatus connected, as indicated by block 304a. If the accessory is of a known type that is suitable for use with the auxiliary host, i.e. the codec host 230; then control over data transfer with the accessory may be handed over to the codec host 230. The codec host 230 may then enumerate, (as illustrated at block 305a) to become the active host. Subsequent communication with the accessory apparatus may then be controlled by the codec host 230.

This alternative scheme has the advantage that the AP is not involved at all. This may allow the AP 110 to enter a low power or sleep mode when not being used. This can reduce power consumption of the electronic device as a whole.

As mentioned above some accessories may have control buttons for power-on or the like and thus in some instances it may be necessary to monitor for commands received via the accessory apparatus 101, even when there is no on-going data transfer. For digital data communication this would require the host 130 of the AP 110 to be active at least periodically requiring the AP 110 itself to be powered.

Additionally or alternatively some electronic devices 200 may have an 'always-on' capability for receiving voice commands. Thus when a user speaks a recognised voice command it is desirable for the electronic device 200 to wake itself from a sleep state and process the command. This requires continuing monitoring for possible voice commands, although to reduce power consumption relatively basic processing is performed unless and until a signal indicative of likely voice activity is received. With a connected audio accessory apparatus 101 the voice command may be received via the accessory apparatus 101, which thus again means that the electronic device should be able to receive data from the connected accessory at any time, requiring the relevant USB host to be active.

The power requirements of a codec 213, even when running a USB host, are typically significantly lower than those of the AP 110 and thus using the codec 213 to provide a USB host for monitoring communication from the accessory apparatus 101 when the electronic device 200 may be in a sleep mode may reduce the overall power consumption of the electronic device 200, which is advantageous, especially for portable electronic devices where battery life is often an important consideration for users.

Further in some instances the second data path 202 need not transfer audio data via the AP 110. For example if the audio data is to be transferred to/from a component of the electronic device, e.g. audio data is to be streamed from a memory 111 or transferred with a wireless module 112 then the AP 110 may be active in selecting the second data path 202 but the second data path for the audio data itself may avoid the AP itself as illustrated by path 206 in FIG. 2, via AIF 142 of the codec 213. In this case once the second data path has been established the AP 110 may enter a lower power or sleep mode unless required, e.g. based on received control information in which case the auxiliary host 230 may generate a suitable interrupt for the AP 110.

The use of the second digital data path 202 via a second data bus host 230 on an audio circuit such as codec 213 may therefore allow the AP 110 to power down more often which may result in a lower overall power consumption than would be the case using the first data path 201.

Note that as used herein the reference to a pair of digital audio interfaces refers to the interfaces at either ends of part of a link forming the second data path. The digital audio interfaces form a pair as part of the second data path, for instance AIF 141 of the codec may form a pair with AIF 140 of the AP. It should be understood though that a digital audio interface that forms part of a pair of second path data interfaces may also be used to communicate with other interfaces. For example digital audio interface 141 of the codec 213 may be operable to communicate with the AIF 140 of the AP or some other audio interface, for example as part of a multi-drop bus. In use if the second data path is established via the codec 213 and AP 110 then AIFs 141 and 140 may form a pair at that time as part of the second data path.

Referring back to FIG. 2 it will be appreciated that there two separate PHY circuits 109 and 209, which may be of similar specification, e.g. both may be USB 2.0 PHY circuits. There is thus a first interface, comprising PHY 109, in the first data path 201 and a second interface, comprising PHY 209, in the second data path 202.

Thus, in such an example, an electronic device would comprise an application processor 110, a connector 106 (such as the USB type-C connector, another rotationally symmetric connector or any other connector) for connecting the electronic device 200 to an accessory device 101, an audio codec 213 providing audio signals to the connector 106 and/or receiving audio signals from the connector 106, and a first PHY 109, for example a USB PHY, configurable to provide a first signal path 201 for digital signals between the application processor 110 and the connector 106. The first PHY 109 may be integrated on the application processor, or may be provided on a separate integrated circuit, such as a power management or power delivery integrated circuit or a dedicated link PHY or combined controller/PHY integrated circuit.

The audio codec 213 may further be coupled to the application processor 110 via a digital Audio Interface (AIF) 140 and 141 on each of the AP 110 and codec 213 respectively. Audio codec 213 may also be coupled to the connector 106 and may comprise a second PHY 209 which is configurable to provide a second signal 202 path via the digital Audio Interfaces and audio codec 213 for audio signals. In some instances the second signal path 202 may be between the connector 106 and a functional module such as a wireless modem 112 via the same or a separate codec digital Audio Interface 142. The second signal path 202 may have a lower latency than the first signal path 201. The second signal path 202 may be suitable for use, for example, when the wireless modem receives wireless communications signals comprising an audio component (such as a voice, e.g. if the electronic device is making a voice call via a mobile communications network). The second signal path 202 may, in some instances, additionally pass via the application processor 110. However in that case in contrast to the first signal path the transfer of data to the AP uses AIFs that are suitable for low latency transfer of time sensitive audio data and avoids a generic digital interface 131, thus there may be one or more layers of a software stack or framing or buffering operations that are not implemented in the data path through application processor 110 so as to achieve lower latency.

The first PHY 109 and the second PHY 209 may be connected to at least one common contact (and possibly a plurality of common contacts) on the connector 106.

Thus each of PHY 109 and 209 may be connected to the switch arrangement 207 and in some arrangements the relevant PHY which is not selected for use be controlled so that the outputs are tri-stated into a high impedance state.

FIGS. 4a to 4d illustrate various examples of the processing modules of the device 200 through which data traffic may propagate in various use cases. These processing modules may comprise dedicated hardware or may comprise programmable hardware executing software code. Subsets of these modules may be regarded as a software stack. Each of FIGS. 4a to 4d illustrate the same general processing modules that may be available in a device 200, such a smartphone operating the Android™ operating system and illustrate the modules involved in the first and second data paths.

Figure 4A:
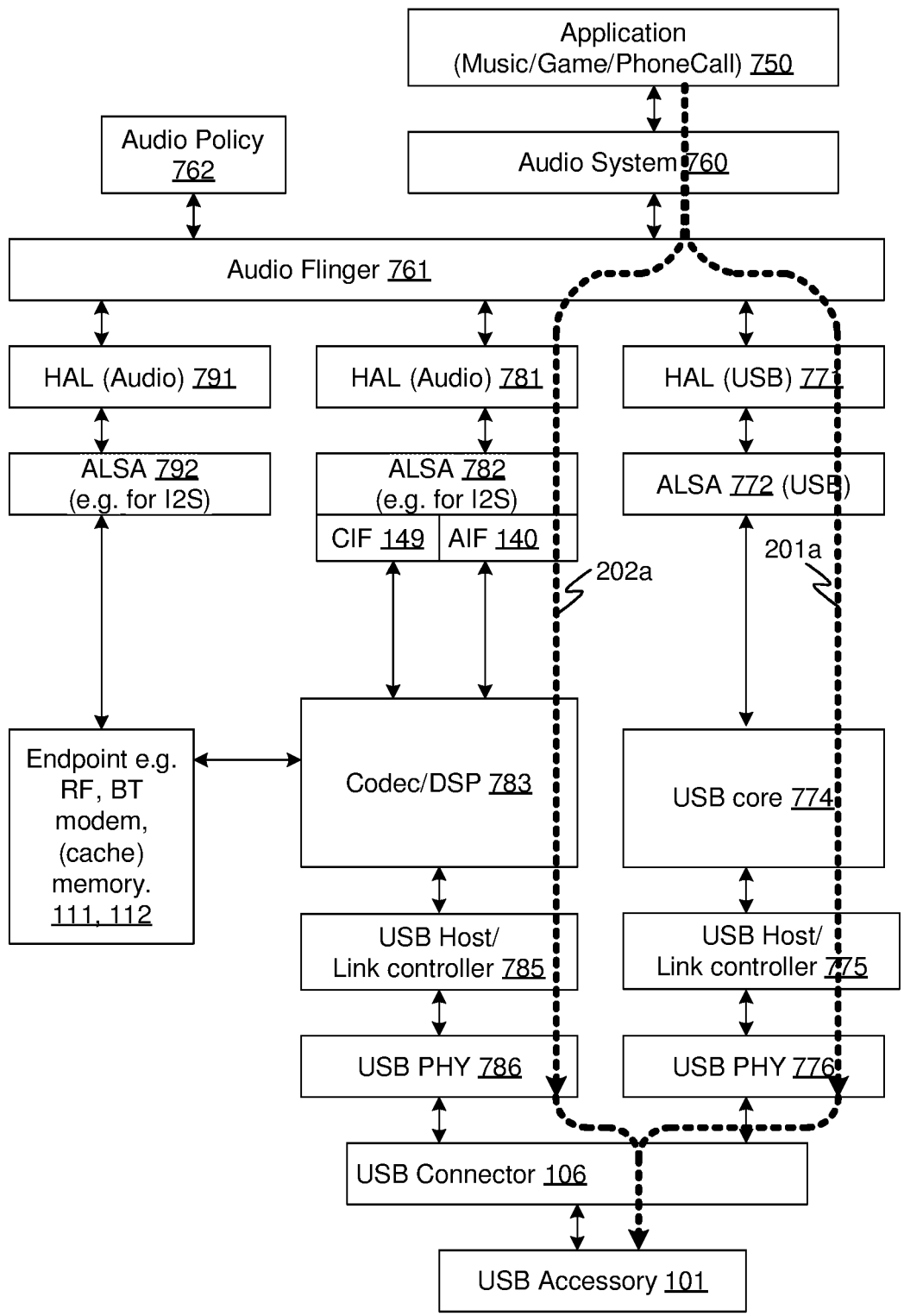
FIGS. 4a to 4d illustrate various processing modules of an electronic apparatus and illustrate the processing modules used in various data paths in different use cases.

FIG. 4a illustrates a use case where audio originating in a user application 750 executed on the AP such as a game is to be transmitted to an output transducer of a connected accessory apparatus 101. Digital audio data produced by the user application 750 may be processed by Audio System 760 then passed to an Audio Flinger module 761 which will forward the data to the desired output device.

For the first signal path 201a, i.e. a conventional USB output path, this data will pass through a Hardware Abstraction Layer (HAL) 771 to decouple the processing from the detail of the following path and then via an Advanced Linux Sound Architecture (ALSA) layer 772 or similar comprising drivers for the subsequent USB layers. These USB layers may comprise a USB core 774, USB Host 775 (which may comprise a link controller) and a USB PHY 776 which transmits the data as USB signals via the USB connector 106 to the USB accessory 101.

For the second signal path 202a, if appropriate for the connected accessory, the data will pass through a different HAL 781 and then via an ALSA layer 782 or similar comprising drivers for the subsequent digital Audio Interface, to deliver data in an appropriate fashion for the chosen AIF format, for example I2S. This data will then pass and be routed through the Codec or similar audio processing circuit 783, possibly with some signal processing applied by on-chip DSP. The data is then forwarded via a suitable physical interface, for example SPI or I2S to the USB Host 785 which forwards the data into a USB PHY 786 and thence as USB signals via the USB connector 106 to the USB accessory 101.

Modules in the second data path 202a may only be required to deal with certain classes of data and may thus be lower complexity and lower processing effort classes and may also require less frame-by-frame buffering than parallel modules in the first data path, which must handle a wide variety of USB data classes. To reduce power and/or to allow multiplexing of other processing using the same hardware, the processing in the first path 201a may also be executed in a burst mode and thus require extra buffering to accommodate worst-case variable queuing delays. The latency of the second data path is thus naturally lower than that of the first data path, for example of the order of 15 ms versus 100-200 ms.

Audio data may also propagate in the opposite direction down either data path, with a similar difference in latency.

Figure 4B:
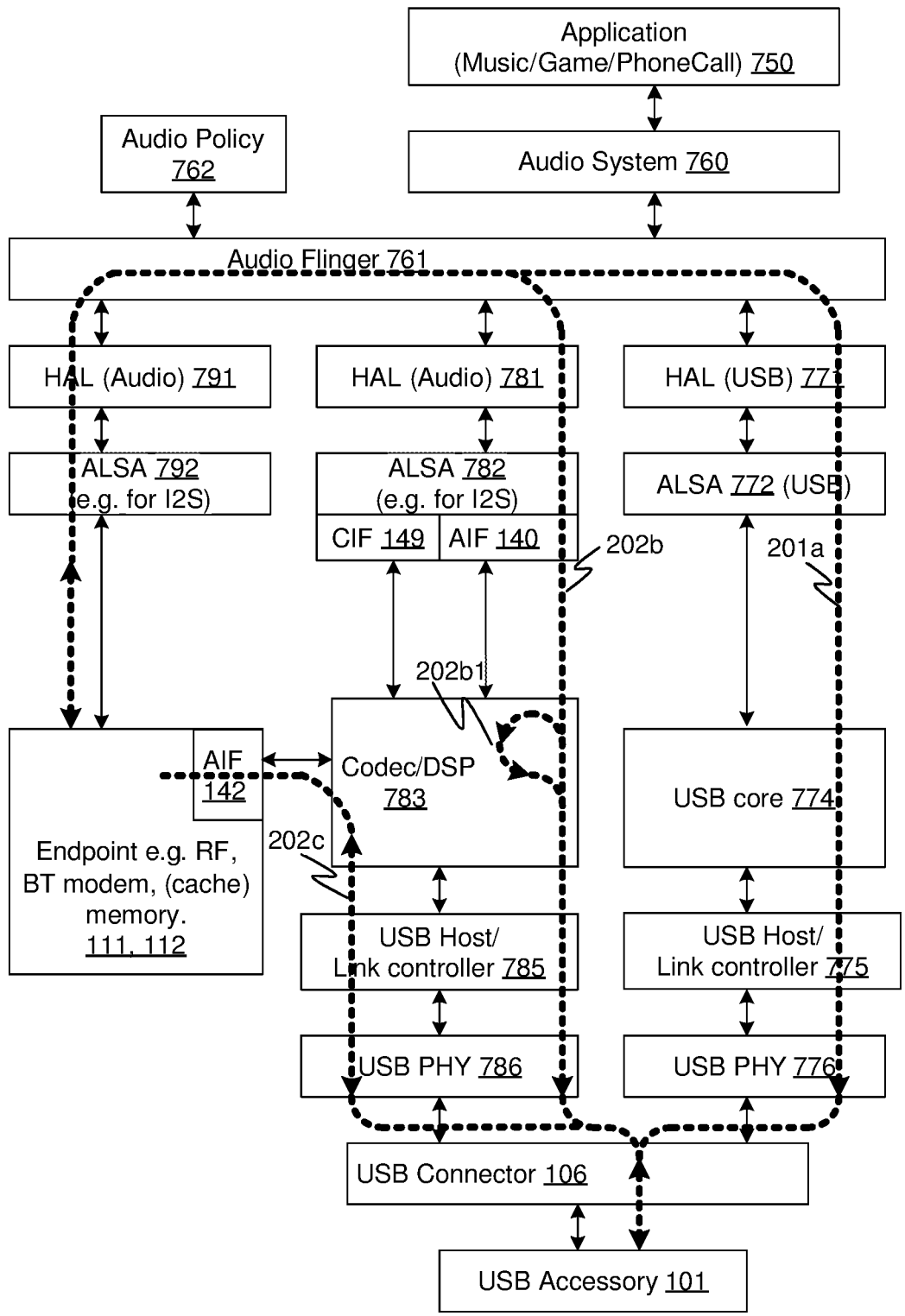

FIG. 4b illustrates the processing modules through which data traffic propagates in use for the case of a voice call, where the local audio data endpoint (sink or source) may be a wireless modem from a telecommunication network, for instance a cellphone network.

In this use case the first signal path 201b may be a conventional signal path for audio data from say a voice microphone in a USB accessory 101, for example a USB headset accessory. Such a data path may pass through the USB PHY 786 USB Host 775, USB core 774, USB ALSA 772 and USB HAL 771 into the Audio Flinger 761 in a similar manner as described with respect to FIG. 4a. The Audio Flinger would then pass the voice data via an Audio HAL 791 and ALSA 792, to be transmitted by the wireless modem 112. This data would encounter substantial latency through the general-purpose USB-related modules, as would far-end voice data from the wireless modem to speakers in the accessory.

In this instance the provision of second USB PHY 786 and Audio Interface 140, enables a second, alternate, data path 202b via Audio Interface 140 as illustrated, with substantially less latency than the first data path 201b.

In some instances it is common for the user's voice from the voice microphone of the connected accessory, e.g. headset, to be fed back into the headset speakers as a side-tone. This sidetone signal may conveniently be added in the codec as illustrated by path segment $202b_1$. This avoids the possibly excessive delay through the conventional USB stack.

In some embodiments, there may also be a data link, possibly via another AIF 142, directly from the wireless modem 112 to the codec 785. This enables the provision of a further data path $202b_2$ between the connected accessory 101 and the wireless modem 112, avoiding the ALSAs 782 and 792 and the Audio Flinger, thus further reducing latency.

Note similar latency advantages are obtained when the wireless modem is for example a Bluetooth accessory or similar local wireless network used for the transfer of time-critical data, for instance audio data.

Figure 4C:
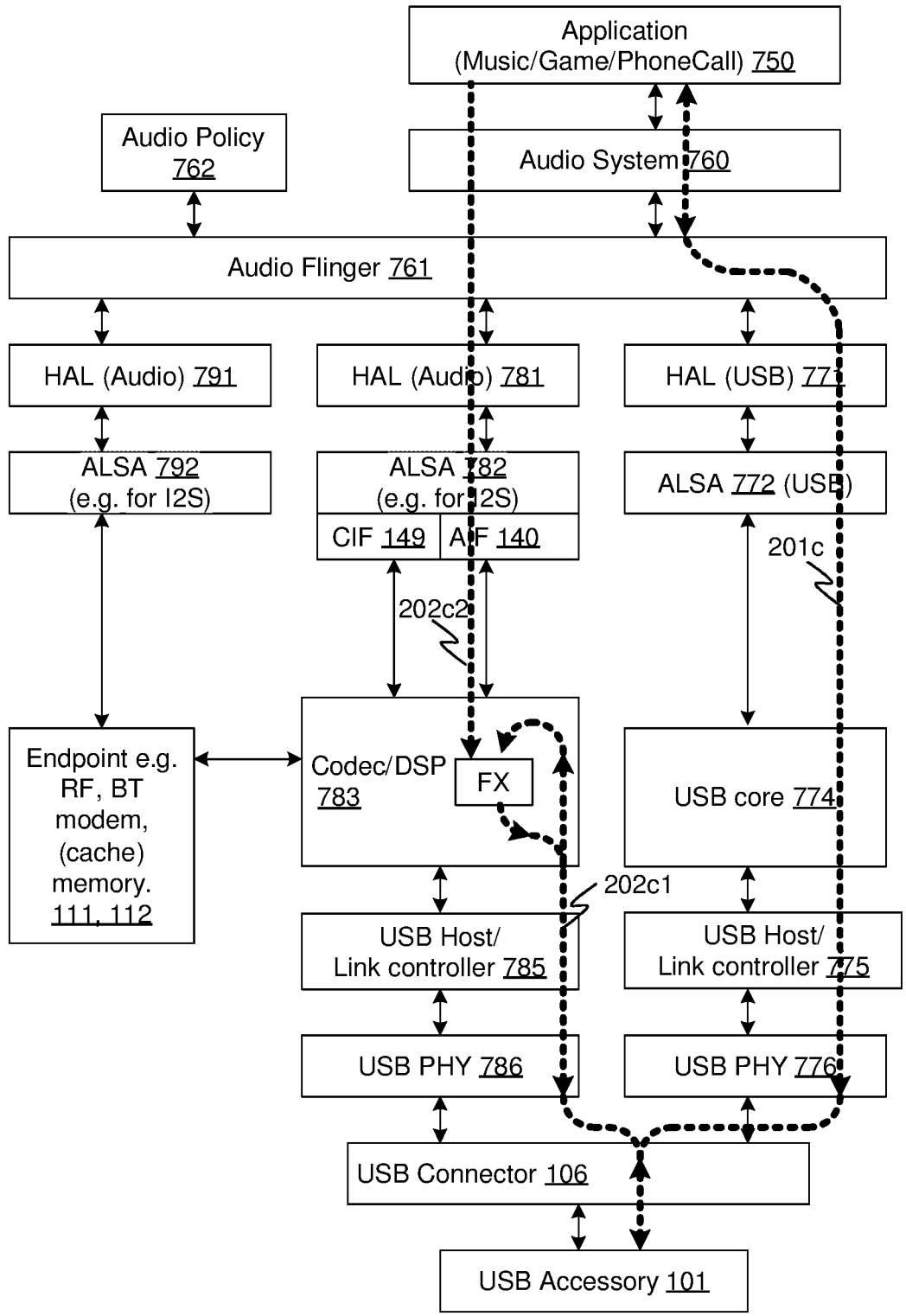

FIG. 4c illustrates the processing modules through which data traffic propagates in use for the case of a karaoke application, for example, where the user's voice may be added to some music data stream and played back through speakers in the accessory, possibly with some signal processing to enhance the user's voice.

Using the normal USB connections the user voice signal would have to propagate via a first path 201c all the way up the stack to the Audio System 760 and back again.

Using a second path 202c, via the alternate USB PHY 786, the feedback and enhancement of the user's voice could be executed in the codec DSP 783 and thus would not need to propagate to the Audio Flinger 761. The music accompaniment may originate in some compressed music file processed by an application 750 or in the Audio System 760 and would arrive at the codec 783 via path $202c_2$ to be merged with the user's voice in the codec. Latency to the accessory along this path is less important, but would be less than via the first path 201c.

USB headsets or other accessories may also comprise buttons or other user inputs to generate control commands. For instance for gaming applications audio cues, for example brake or tyre squeal or gunshots, played to the user must be responsive to button presses on an accessory, with a similar requirement for short latency between the physical button press and the acoustic playback of the audio cue.

Figure 4D:
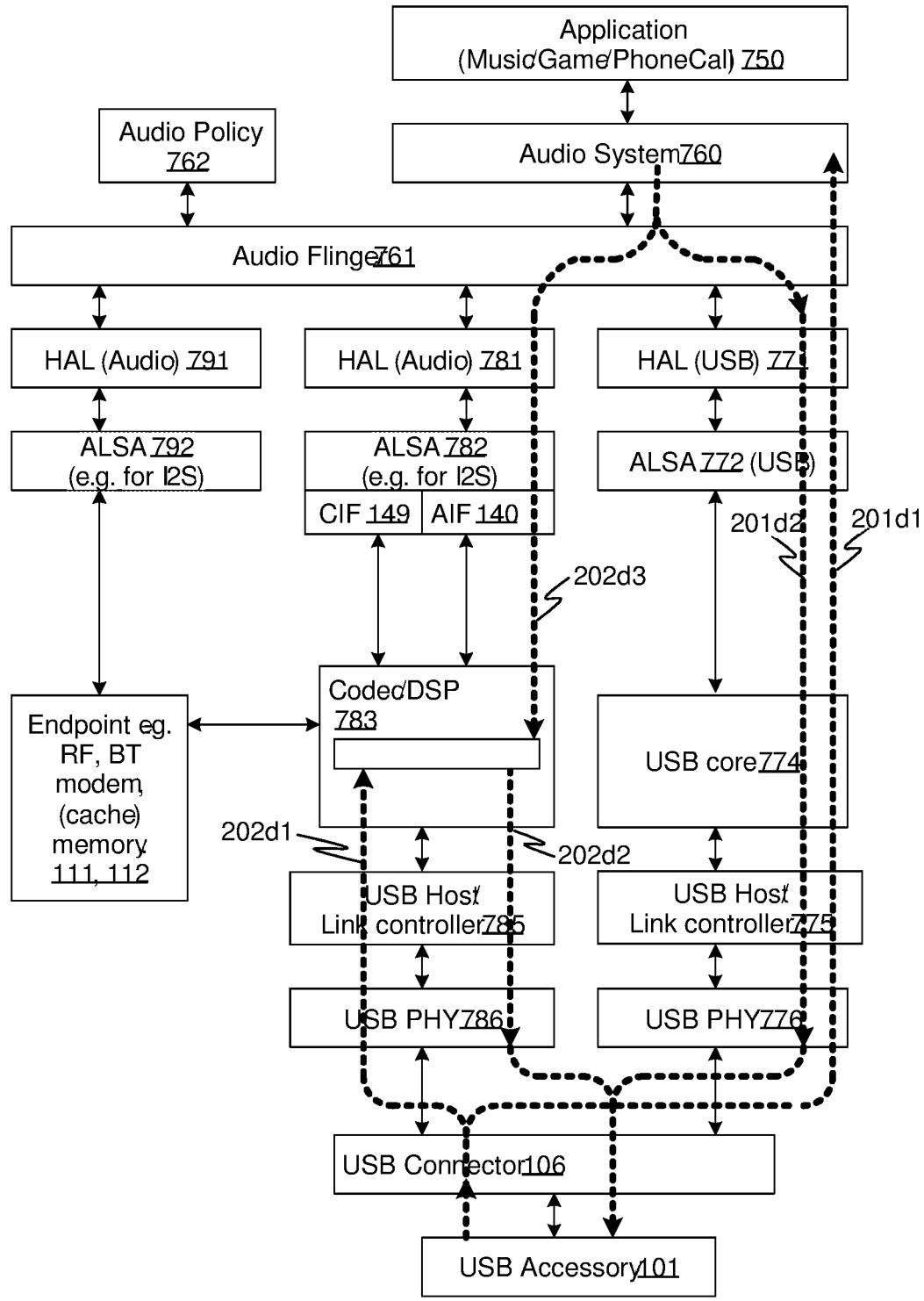

FIG. 4d illustrates the processing modules through which data traffic propagates in use for the case of such a gaming application.

Using a first data path via the general-purpose USB link via USB PHY 776, a button press signal from the accessory must propagate via upward path segment 201d, through the USB stack all the way up to the Audio System 760 which may then respond with audio data to be rendered after transmission back down the USB stack via downward path $201d_2$ to the accessory 101.

Using a second data path, the button press signal may only need to propagate via upward path segment $202d_1$ as far as the codec 783, where an on-chip DSP may be able to retrieve the appropriate audio data from local memory, for instance from memory 111 if there is direct access thereto, and send it via downward path segment $202d_2$ back to the accessory 101. In some instances the appropriate audio cue may need to be retrieved from further up the chain via path $202d_3$, but there is still a latency benefit in using the more light-weight dedicated USB stack of host 785 rather than the more general purpose USB core 774 and host 775 of the first data path.

Thus in a variety of use cases the possibility of a second, alternative, data path via an Audio Interface and Audio-optimised USB stack rather than through a full general-purpose data interface and general-purpose USB stack offers advantages of lower latency. This is especially true where an AIF connection may be made directly to the codec from other device components such as wireless modems or the like. In addition the possibility of directly accessing a DSP of the codec 213/783 via the dedicated second USB interface rather than using digital signal processing in the AP core also allows lower latency. Latency of response to command data such as button-presses in gaming applications is also improved.

The device 200 of FIG. 2 is illustrated as comprising two separate connectors, one connector 106 for instance a USB-C receptacle, for digital data transfer via either the first data path or the second data path, and a second connector 106a, for instance a 3.5 mm jack socket for analog audio signals for analog accessories that may be connected. However the traditional 3.5 mm jack is quite bulky compared to the USB-C connector, and having two connectors rather than one increases manufacturing material costs and increases the problem of managing ingress of water and dirt into the device 100. It is thus desirable to eliminate one of these connectors.

As mentioned above the USB Type-C connector is designed to be suitable for fast bulk digital data transfer, as well as power delivery, and can be seen as a general purpose or multi-purpose data connector. Whilst primarily envisaged for use for bulk digital data transfer the USB Type-C specification describes that a stereo headset may be connected to a host device via a type-C receptacle of the host device by use of a separate adapter 108 with a jack socket for a standard 3.5 mm TRRS audio jack plug and with a USB-type C plug. Annex A of the USB type C specification describes this Audio Adapter Accessory Mode.

In Audio Adapter Accessory Mode of operation the electronic device may transmit at least one analogue audio signal to a connected accessory apparatus and/or provide a microphone bias signal/receive an analogue audio signal via defined pins of the connector 106 normally associated with digital USB operation.

Figure 5:
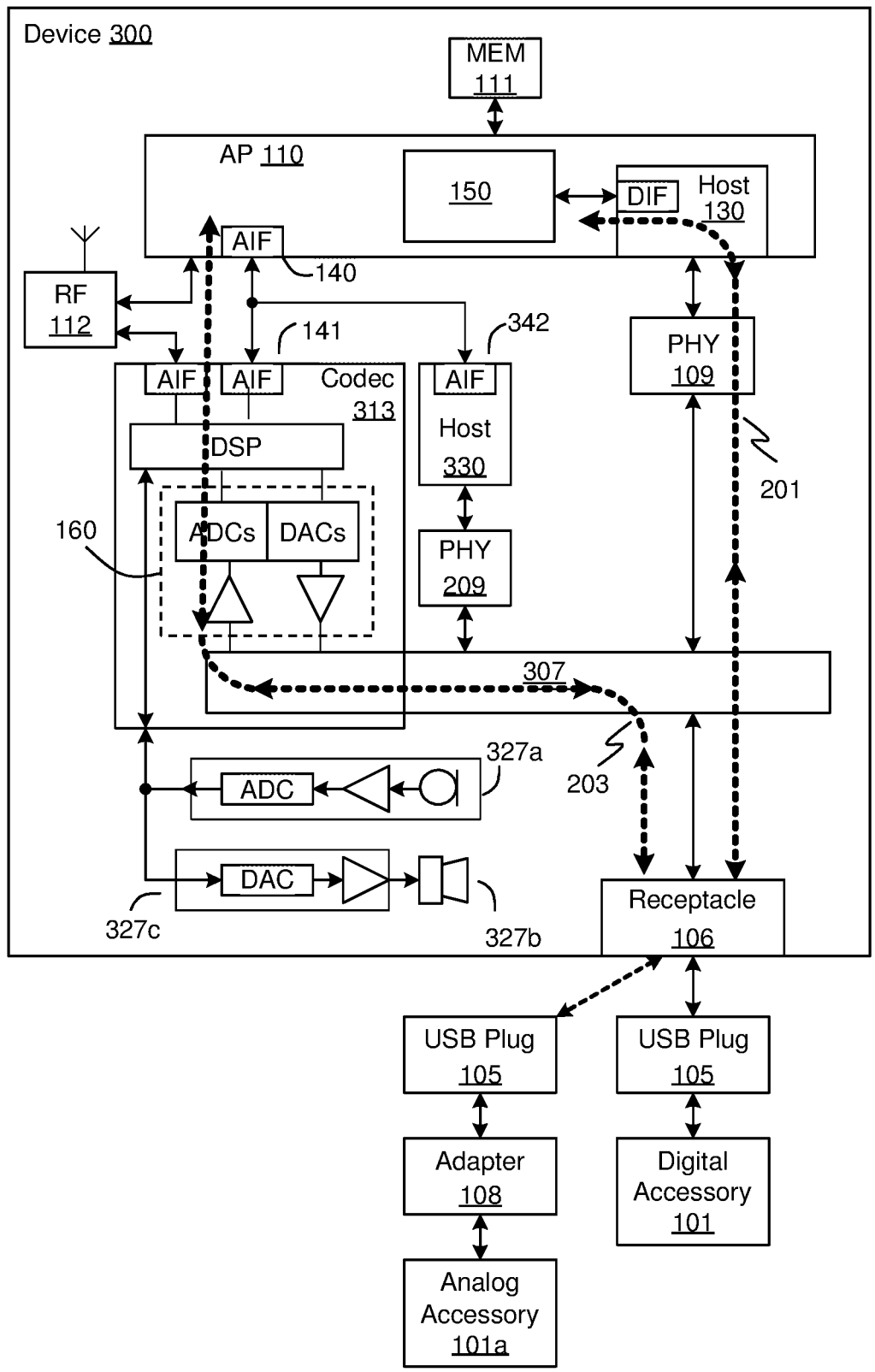
FIG. 5 illustrates an electronic device according to another embodiment.

FIG. 5 illustrates an electronic device 300 configured to support this Audio Adapter Accessory Mode. The device comprises a switch arrangement 307 similar to switch arrangement 207 described with reference to FIG. 2. Switch arrangement 307, which may comprise a switch network or other routing or multiplexing circuitry, is configurable to be able to transfer analog signals between specified pins of the USB connector 106 and analogue interface circuitry 160, e.g. ADCs or DACs, of codec 313. Between the analogue interface circuitry 160 of codec 313 and the AP 110 appropriate digital signals are transferred via the Audio Interfaces 140 and 141 of the codec and the AP 110, possibly with some processing applied by a DSP of the codec 313. An analog accessory 101*a* when attached via a suitable adapter 108, such as a 3.5 mm-jack-socket-to-usb-plug adapter, may thus receive analog signals for driving output transducers and/or transmit analog signals from input transducers.

The codec 313 may also be used for transfer of analogue audio signals to/from on-board audio transducers (not shown) of the host electronic device 100 itself as described with respect to FIG. 1. In some instances the codec 313 may additionally or alternatively be configured for transfer of digital audio data with on-board transducer modules. For instance the codec 313 may accept digital audio data streams from digital microphone modules 327*a* and/or transmit digital data for a loudspeaker 327*b* via a digital power amplifier 327*c*, which may be comprised in device 100 and separately integrated as illustrated.

In an embodiment such as illustrated in FIG. 5 there may be no separate connector for legacy analog accessories. However in other embodiments the second connector, e.g. 106*a*, may be retained and may be driven from codec 313, in a similar fashion as described with respect to FIG. 2, whilst the codec 313 also has the capability of driving analog signals onto the first connector in Audio Adapter Accessory Mode. In further embodiments, there may be other connections of analog signals from the codec to the first connector for example reassigning signal lines to drive accessory loudspeakers in a differential configuration.

In the discussion above the second, alternate, data path for low latency USB has been described via a second PHY 209 and an auxiliary host 230 embedded within the codec.

However a second PHY 209 could be implemented externally to the codec and interface to an auxiliary host embedded in the codec or, as illustrated in FIG. 5, both the second PHY 209 and auxiliary host 330 could be implemented externally to the codec 313. In such a case the auxiliary host 330 may have at least one AIF 342 for transfer of digital audio data with the AP 110 via AIF 140 and/or with the codec 313 via AIF 141.

Figure 6:
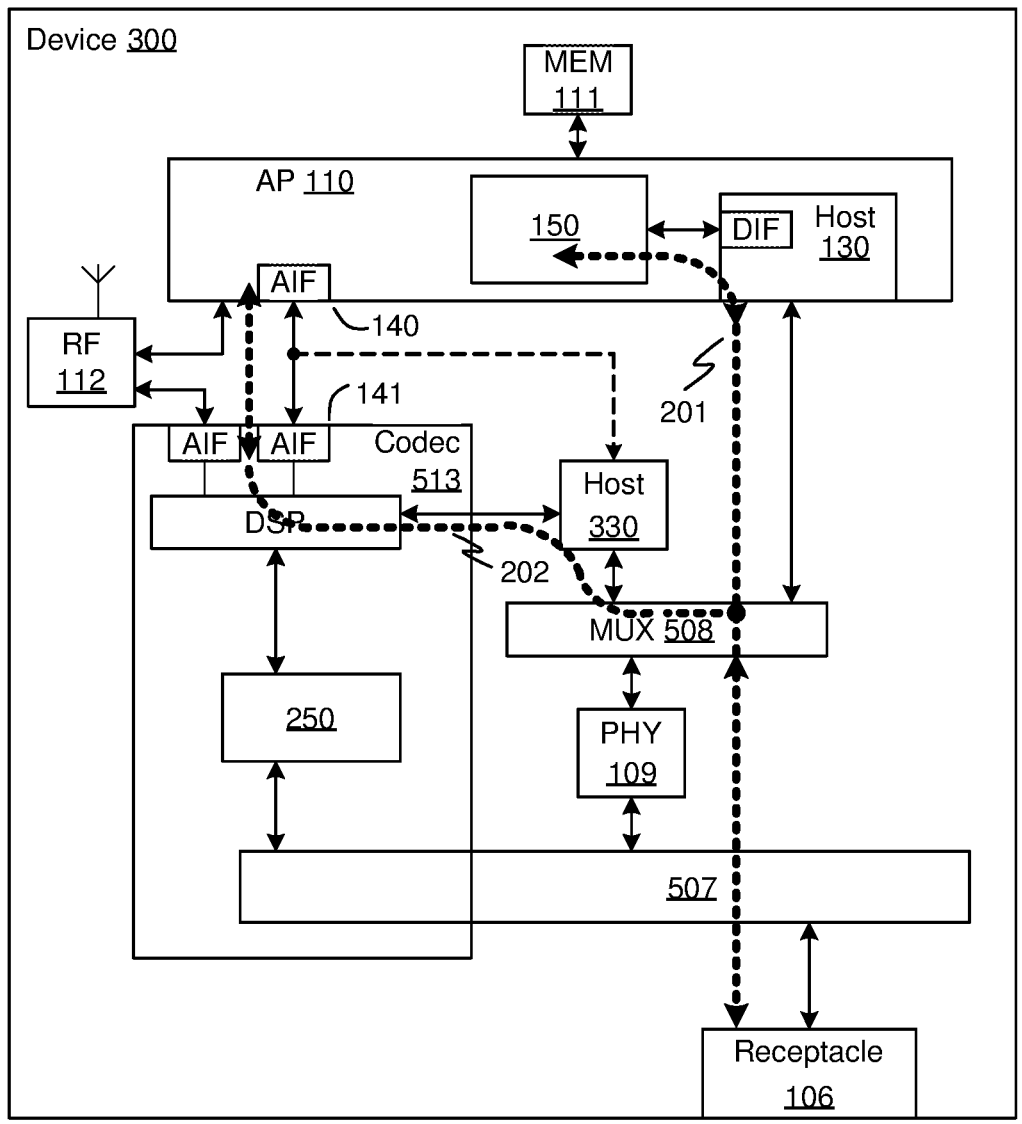
FIG. 6 illustrates an electronic device according to another embodiment.

In some embodiments a single USB physical layer circuit (PHY), e.g. a single USB transceiver, may be shared between the first and second data paths, as indicated in FIG. 6. In the embodiment illustrated in FIG. 6 there is one physical layer circuit, PHY 109 which is shared between the first data path 201 and second data path 202. The PHY 109 may be coupled to the main USB host 130 of the AP 110 in a similar fashion as described previously but may also be coupled to an auxiliary host 330. The PHY 109 may be coupled to the auxiliary host 330 and main host 130 via any suitable connection, for example via the known ULPI interface for connecting a USB link layer to a PHY. The PHY could be coupled to suitable pins on codec 513 and AP 110 with the relevant pin of the codec 513 or AP 110 being tri-stated when not selected for use or there may be some path switching element such as a multiplexor 508. In some embodiments one or more of the auxiliary host/link controller 330, multiplexer 508 and/or PHY 109 may be co-integrated with other circuitry on the codec 513.

Figure 7:
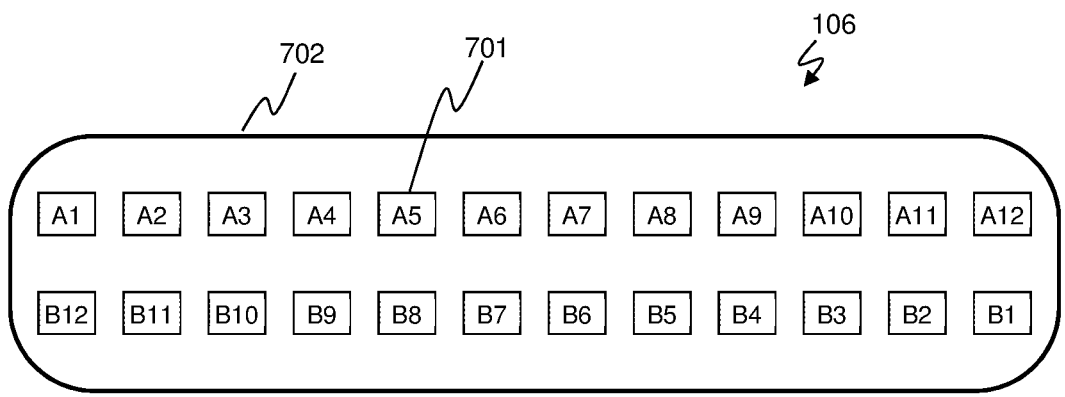
FIG. 7 illustrates the principles of a USB Type_C connector.

As described previously the embodiments described are suitable for use with a USB Type-C connector. FIG. 7 illustrates the principles of a USB type-C connector 106. The connector has two rows of pins or contacts 701, with twelve pins in each row. Note that as used in this specification the term pin in relation to a connector shall mean an electrical terminal that may establish an electrical connection with a corresponding terminal of another connector when the connectors are correctly mated and the term contact shall mean the same. The pins are arranged so that the rows are rotationally symmetric (of order 2). The pins of type-C connector may be provided at least partly surrounded by a guide 702, which could for instance be the walls of a socket or, for a plug, some protective/guiding sheath, which may also be rotationally symmetric and may for instance have the form of a rounded rectangle.

In general therefore embodiments of the present disclosure relate to electronic devices which have a first connector for removably connecting the electronic device to an accessory apparatus for data transfer and which have at least two data paths for digital data transfer, for example USB digital data transfer, with an accessory apparatus connected to the electronic device via the first connector, where the two data paths can be used as alternatives for audio data transfer. For streaming of audio data, e.g. just Class 1 or Class 2 Audio data, and/or some HID control data an auxiliary data path, which may be low latency, may be selected for use.

Embodiments also relate to the provision of an auxiliary data bus host, e.g. a USB host, on an audio codec of an electronic device with the auxiliary data bus host being configured to transfer data with an applications processor or other module of the electronic device via a digital audio interface. Thus in some embodiments an electronic device may comprise an applications processor and an audio codec and a first connector for removably connecting the electronic device to an accessory apparatus for data transfer. The applications processor may have a first digital interface, e.g. a general purpose digital interface, for communication with a first data bus host for transfer of digital data with a connected accessory apparatus via the first connector. The applications processor may also have a digital audio interface operable for communication with a second data bus host on the audio codec for transfer of digital data with a connected accessory apparatus via the first connector.

Embodiments also relate to an audio codec with a USB interface for input and/or output of USB digital data with a USB connector of the host device wherein the USB host may exchange digital data with another component of a host electronic device via a first digital audio interface of the audio codec. The USB interface may be configured for transfer of Class 1 Audio data, Class 2 Audio Data and/or Human Interface Device control data. The audio codec may also comprise analogue interface circuitry for input/output of analogue audio signals from/to audio transducers. In use, audio data for operating said audio transducers may be streamed to/from the analogue interface circuitry from/to another component of the host device via the first digital audio interface.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile telephone, an audio player, a video player, a PDA, a mobile computing platform such as a laptop computer or tablet and/or a games device for example.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. An electronic device comprising:
a first connector for removably connecting the electronic device to an accessory apparatus for digital data transfer;
a path selector operable to establish a first digital data path between a first module of the electronic device and the first connector and also operable to establish a second digital data path between the first module of the electronic device and the first connector;
wherein the first digital data path comprises a first data bus host and a general purpose digital data interface suitable for bulk data transfer between the first data bus host and a processing module of an applications processor;
wherein the second digital data path comprises a second data bus host and at least one pair of second path data interfaces between the second data bus host and the first module, wherein the second data bus host does not form part of the applications processor and each of said second path data interfaces comprises a digital audio interface suitable for streaming of audio data; and
wherein the path selector is configured to selectively establish the first data path or the second data path.

2. An electronic device as claimed in claim 1 wherein each of the first and second data bus hosts comprises a respective USB host.

3. An electronic device as claimed in claim 1 wherein the general purpose digital data interface and the first data bus host are integrated with the applications processor.

4. An electronic device as claimed in claim 1 further comprising an audio codec.

5. An electronic device as claimed in claim 4 wherein the second data bus host is integrated with the audio codec.

6. An electronic device as claimed in claim 5 wherein said at least one pair of second data path interfaces comprises a first digital audio interface of the audio codec.

7. An electronic device as claimed in claim 6 further comprising at least one audio transducer wherein the audio codec is configured such that said first digital audio interface can also be used for audio data transfer when operating said at least audio transducer.

8. An electronic device as claimed in claim 4 wherein the second data bus host is formed as a separate component to the audio codec.

9. An electronic device as claimed in claim 4 wherein the audio codec is also operable in an analogue accessory adapter mode for transfer of analogue audio signals to and/or from a connected accessory apparatus via the first connector.

10. An electronic device as claimed in claim 1 wherein the path selector is configured to select the first digital data path or the second digital data path depending on detection of a type of accessory apparatus connected and/or a type of digital data transfer required.

11. An electronic device as claimed in claim 1 wherein the path selector is configured to select the first digital data path as a default data path for data transfer with an accessory apparatus connected to the first connector and to select the second digital data path only when a suitable audio accessory apparatus is connected and/or the only data to be transferred between the electronic device and the connected accessory apparatus is audio data and associated control data.

12. An electronic device as claimed in claim 1 wherein the path selector comprises a switch arrangement operable to selectively route signals between the first connector and either of the first and second data bus hosts.

13. An electronic device as claimed in claim 12, wherein the audio codec is also operable in an analogue accessory adapter mode for transfer of analogue audio signals to and/or from a connected accessory apparatus via the first connector and wherein the switch arrangement is further operable to selectively route said analogue audio signals between the first connector and the audio codec.

14. An electronic device as claimed in claim 1 wherein the first module is a module of the applications processor and wherein said at least one pair of second path data interfaces comprises a first digital audio interface of the applications processor.

15. An electronic device as claimed in claim 1 wherein the first module is a module of the electronic device which is separate from the applications processor.

16. An electronic device as claimed in claim 15 wherein the first module is a wireless modem.

17. An electronic device as claimed in claim 15 wherein the second data path between the second data bus host and first module passes via the applications processor and said at least one pair of second path data interfaces comprises a first audio interface of the applications processor for data exchange with the second data bus host and a second audio interface of the applications processor for data exchange with the first module.

18. An electronic device as claimed in claim 15 wherein the second data path between the second data bus host and first module bypasses the applications processor and said at least one pair of second path data interfaces comprises an audio interface of the first module for data exchange with the second data bus host.

19. An electronic device as claimed in claim 4 wherein the second digital data path is configured such that a latency associated with transfer of audio data between the audio codec and a connected accessory device via the second data path is 5 ms or less.

20. An electronic device as claimed in claim 1 wherein the second digital data path is configured such that a latency associated with a round-trip signal between a connected accessory apparatus and the first module of the electronic device via the second digital data path is 20 ms or lower.

21. An electronic device as claimed in claim 1 wherein the first connector is a USB type-C connector.

22. An electronic device comprising:
an applications processor;
a first connector for removably connecting the electronic device to an accessory apparatus for digital data transfer;
a path selector operable to establish a first digital data path between a first module of the electronic device and the first connector and also operable to establish a second digital data path between the first module of the electronic device and the first connector;
wherein the first digital data path includes the applications processor and also comprises a first data bus host for controlling data transfer with a connected accessory via the first connector;
wherein the second digital data path comprises a second data bus host and at least one pair of second path data interfaces between the second data bus host and the first module, wherein the second data bus host does not form part of the applications processor and each of said second path data interfaces comprises a digital audio interface suitable for streaming of audio data; and
wherein the path controller is configured to selectively establish the first data path or the second data path.

23. An electronic device comprising:
a first connector for removably connecting the electronic device to an accessory apparatus for digital data transfer;
an applications processor comprising a first data bus host in a first digital data path for transfer of digital data with an accessory apparatus connected via the first connector; and
a second data bus host in a second digital data path for transfer of digital data with an accessory apparatus connected via the first connector;
wherein the applications processor is connected to the second data bus host via digital audio interfaces;
wherein the application processor is configured, in use, to selectively transfer digital data with the connected accessory apparatus via the first digital data path or the second digital data path.

24. An electronic device comprising:
an applications processor comprising:
a first digital data interface operable for data transfer between a module of the applications processor and a first data bus host, wherein the first digital data interface is suitable for bulk data transfer; and
a second digital data interface operable for data transfer between the applications processor and a second data bus host, wherein the second digital data interface comprises a digital audio interface suitable for streaming of audio data; and
a path controller for selectively routing digital data via the first digital data interface or the second digital data interface;
wherein each of the first data bus host and the second data bus host is configured to control digital data transfer with an accessory apparatus removably connected, in use, to the electronic device via a first connector.

* * * * *